Nov. 20, 1962 H. W. SULLIVAN 3,065,464
PULSE RADAR SYSTEM WITH DIGITALIZING AND SUMMING MEANS
Filed June 16, 1952 7 Sheets-Sheet 1

INVENTOR.
HERBERT W. SULLIVAN
BY Henry L. Shenier
ATTORNEY

INVENTOR.
HERBERT W. SULLIVAN
BY
ATTORNEY

Nov. 20, 1962      H. W. SULLIVAN      3,065,464
PULSE RADAR SYSTEM WITH DIGITALIZING AND SUMMING MEANS
Filed June 16, 1952      7 Sheets-Sheet 4
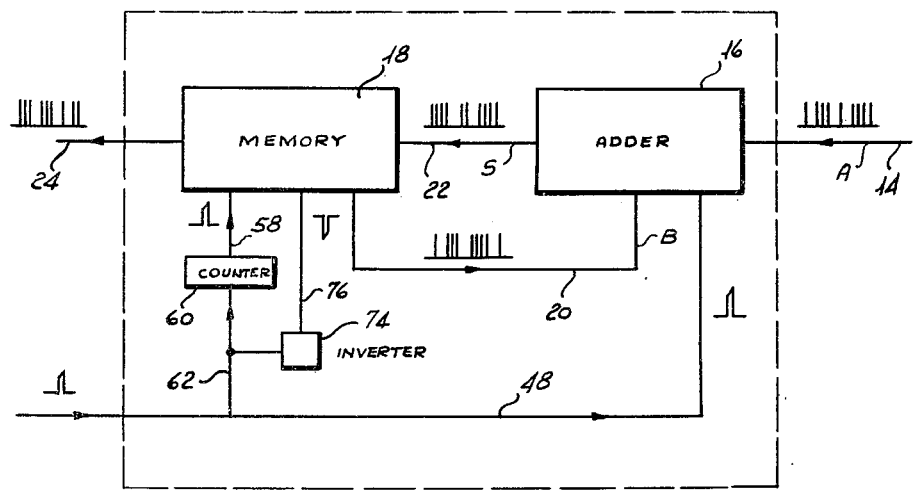
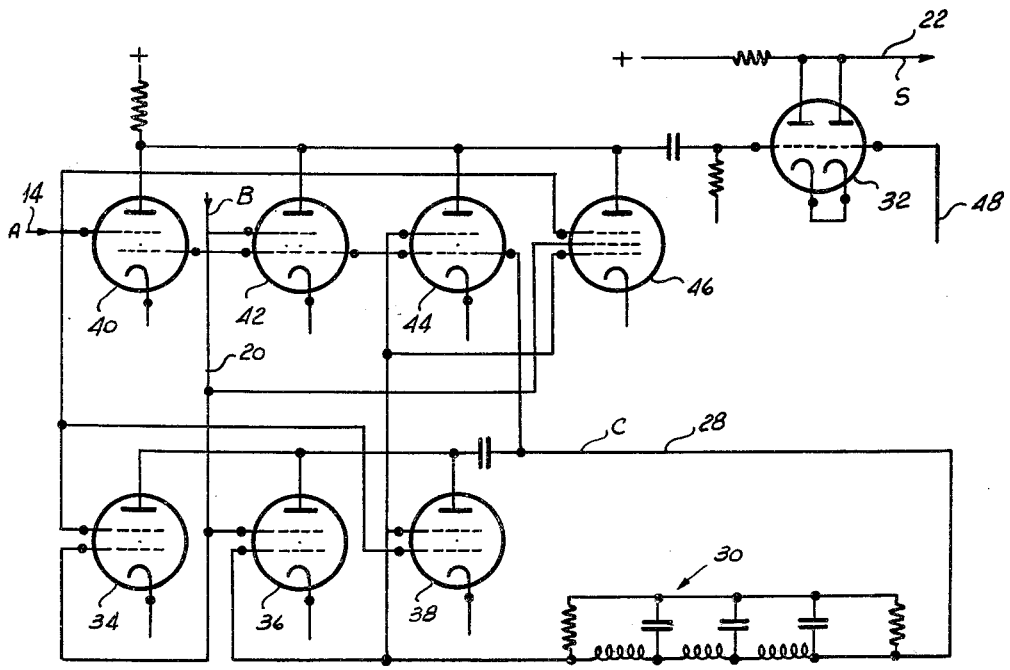
INVENTOR.
HERBERT W. SULLIVAN
BY
ATTORNEY

INVENTOR.
HERBERT W. SULLIVAN
BY
ATTORNEY

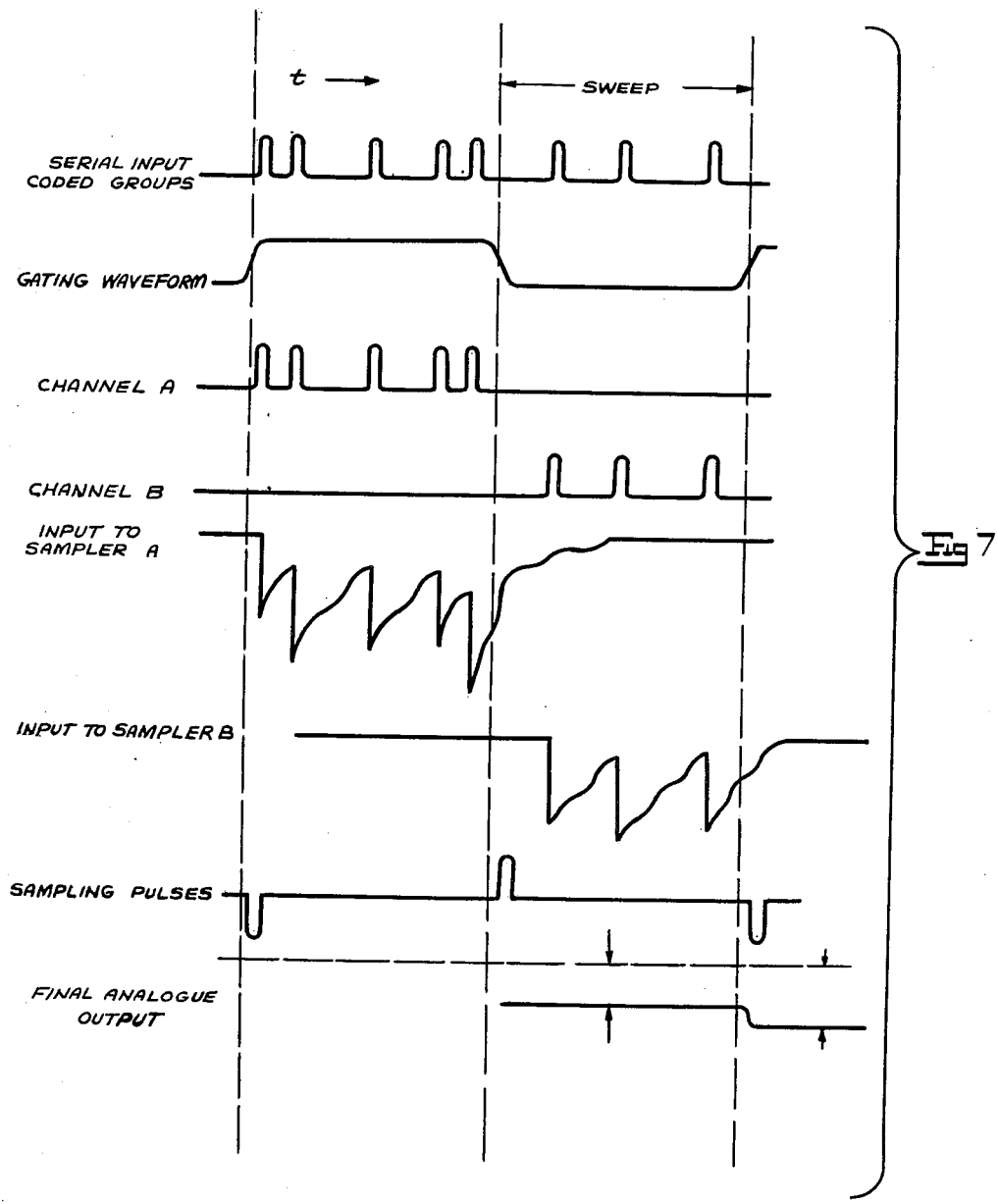

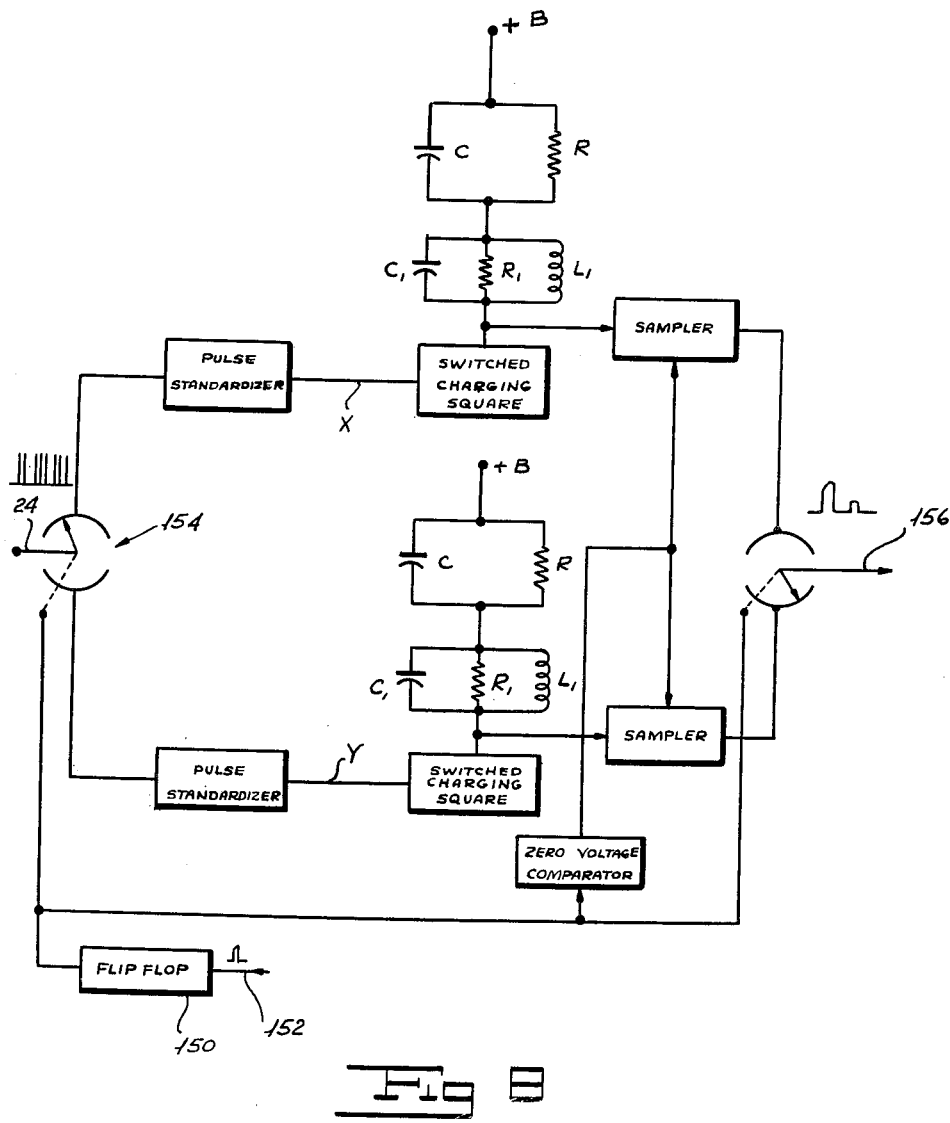

United States Patent Office 3,065,464
Patented Nov. 20, 1962

3,065,464
PULSE RADAR SYSTEM WITH DIGITALIZING
AND SUMMING MEANS
Herbert W. Sullivan, New York, N.Y., assignor, by mesne assignments, to ACF Industries, Incorporated, a corporation of New Jersey
Filed Jan. 16, 1952, Ser. No. 266,679
8 Claims. (Cl. 343—13)

My invention relates to a radar system and more particularly to a radar system adapted to pick up targets at increased ranges and to pick up minute targets in difficult terrain such as periscopes of submarines and the like.

Radar systems known to the art differ widely in detail, design and complexity, depending upon the use for which they are designed and the accuracy and amount of information required. Every basic system, however, comprises six primary components, namely, a timer or synchronizer, which determines the pulse repetition rate of the radar and provides a zero reference point for time measurements and for the operation of sequential functions in a definite phase relationship. This timing may be supplied by a sine-wave oscillator, a multivibrator or a blocking oscillator together with the necessary pulse-shaping circuits. Another method known to the art is to permit the transmitter and its associated circuitry to establish its own repetition rate and provide synchronized pulses for the rest of the system by means of a self-pulsing or blocking radio-frequency oscillator. The second component, the transmitter, has for its function the generation of high-frequency electromagnetic waves which have the faculty of being reflected from objects. It is the measurement of the time elapsing between the initial pulse or "main bang" and the receipt of its reflection which determines the range of the target. The third component, an antenna system, is an integral part of every radar assembly. This has for its function to beam and radiate the energy efficiently into space from the transmitter and to focus and pick up the returning echo and pass it to the receiver. The receiver is disconnected from the antenna system when the transmitter is in operation and is connected to enable the echo to be received. The fourth component, the receiver, is the conventional wide band receiver of any suitable design. The entire system is provided with a conventional power supply comprising a well-regulated low impedance unit which constitutes the fifth component. Pulse-forming lines build up a charge during the inactive period to store energy to discharge in the pulse. In order to display the detected pulses visually so that the range, bearing, or elevation of any echo source or combinations of these factors can readily be determined, an indicator is used. The indicator, which is the sixth component, is a cathode-ray display tube commonly known to the art in which a beam is displayed along either Cartesian or polar co-ordinates as a function of time and the signal appears at a predetermined position which may represent the position of a target both in range and in azimuth.

The resolution of targets by a radar system depends upon the pulse width, the effective antenna beam, the receiver band width, the frequency and the stability of the entire system. The maximum range depends upon the height of the antenna, the power output of the transmitter, and the gain and efficiency of the antenna system. The whole system is limited by the noise level of the amplifier. At long range with a small target it is substantially impossible to distinguish the target from noise. Since the noise is random it sometimes adds to a target return and sometimes detracts. If a target is present there will always be present in the return signal an echo of the target when the radar transmits pulses which are reflected from the target. In marginal conditions even a skilled operator will be unable to determine with assurance the presence or absence of the target due to the masking effect of the noise.

When a large number of returns each corresponding to the same range are added, the sum of all the noise power will tend to approach a fixed value which is proportional to the average noise power. The target returns will also tend to approach a fixed value which is proportional to the average power reflected from the target. If a number of returns from a target are integrated the fluctuations in noise will be decreased and the target returns will coincide so that we will be enabled to distinguish the target with ease. The target return which will occur at the same range will cumulate while the noise which is random will tend to integrate out. The noise in the receiver is purely random but the background noise, such as reflections from the sea, is partly coherent. A useful mathematical representation of such statistical structure is the Markoff Process. (Advanced Theory of Statistics, M. G. Kendall, published by Griffin & Company, Ltd., London, England, vol. 1, 1947, vol. 2, 1948.)

In an analogue system of presentation it is exceedingly difficult to obtain an accuracy in excess of one-tenth of one percent. This is insufficient to enable the isolation of a small target from ground or sea clutter at extended ranges or to minimize the random noise of the amplifier.

Accordingly, I translate the analogue signal received in the receiver into a digital code. I then integrate the successive returns continuously. For example, if the first return be $R_0$ and the second return be $R_1$ and the third return be $R_2$ and similarly, the coded signals representing these returns are integrated in the following manner: $R_0$ is stored. $R_0$ is added to $R_1$. The sum of $R_0$ and $R_1$ is added to $R_2$. The sum of $R_0+R_1+R_2$ is added to $R_3$. The sum of $R_0+R_1+R_2+R_3$ is added to $R_4$. The sums are continuously removed from the integrator and decoded back to analogue form and then fed to an indicator adapted to make an analogue presentation. A large number of returns at a given range and bearing may be necessary to distinguish a difficult target against ground or sea clutter, but eventually, when a sufficiently large number of returns have been integrated, the target will unmistakably appear and the risk of a false return will be obviated.

It will be seen, therefore, that in general my invention contemplates the provision of a conventional radar system in which the signal from the receiver is translated into a digital code, then coded signals continuously added or integrated and then decoded to analogue form and presented in any suitable presentation known to the art.

One object of my invention is to provide a radar system of increased range for a given power output and a predetermined antenna system.

Another object of my invention is to provide a radar system having increased resolution and accuracy.

Another object of my invention is to provide a radar system which will be enabled to pick up difficult targets at long range in difficult terrain.

Another object of my invention is to provide a radar system in which the parameter of the system may be readily changed to accommodate for various types of ground and sea clutter.

Another object of my invention is to provide a radar system in which signals are encoded, the encoded signals integrated and the integrated signals decoded for ultimate presentation in analogue form.

Another object of my invention is to provide a radar system which will enable the ready discrimination between a target return and noise.

Other and further objects of my invention will appear from the following description.

In the accompanying drawings which form part of the instant specification and which are to be read in conjunction therewith and in which like reference numerals are used to indicate like parts in the various views:

FIGURE 4 is a diagrammatic view of the integrator circuit used in my system.

FIGURE 5 is a diagrammatic view of the adder subassembly of the integrator.

FIGURE 7 is a view showing the wave forms present in the decoder.

FIGURE 8 is a diagrammatic view showing a decoder capable of being used in my invention.

Figure 1:
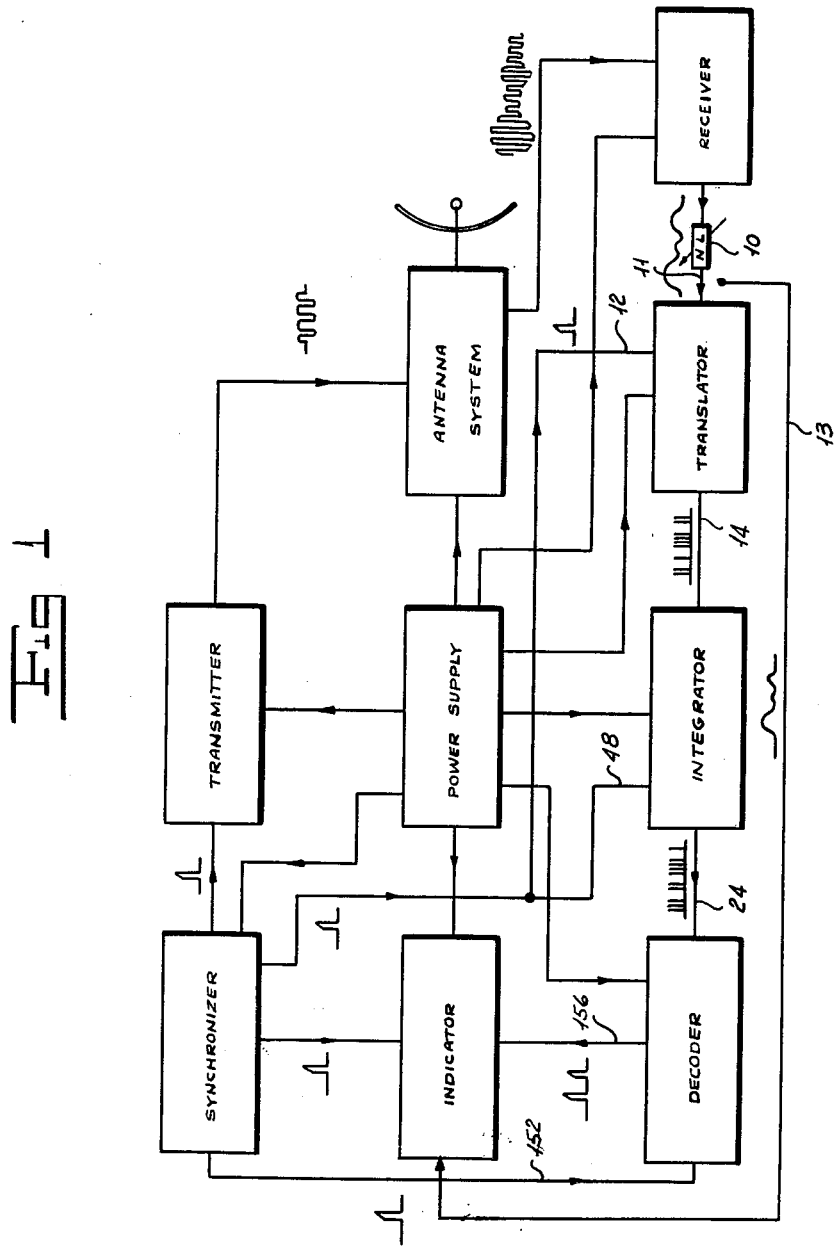
FIGURE 1 is a diagrammatic view of a radar system showing one embodiment of my invention.

More particularly referring now to FIGURE 1, the power supply, the transmitter, the synchronizer, the antanna system, the receiver and the indicator are all fundamental components of a radar system and are conventional. They may be of any suitable design known to the art, as pointed out above. The indicator may be of any suitable type and may have any presentation known to the art employing either Cartesian or polar co-ordinates. These elements will not be described in detail since they are known to the art. No invention is claimed with respect to these in and of themselves, my invention lying in the combination rather than in the individual components of the combination.

The output signal from the receiver passes through a variable nonlinear resistor 10 which may be made of Thyrite, silicon carbide, or the like. Similar materials are known under various names, such as Metrosil and Atmite. These materials have nonlinear conduction characteristics in that they exhibit a nonlinear relationship between current and voltage. The nonlinear resistor introduces a nonlinear function and the particular nonlinear function will vary depending on the type of ground clutter. For example, the surface of the sea will vary from the proverbial millpond smoothness to huge white-capped waves, depending upon the force and direction of the wind. The type of background clutter, therefore, will vary depending on the condition of the sea and the nonlinear function used for each particular kind of sea. In order to obtain the best results, the characteristic curve of the nonlinear resistor should be obtained empirically for a given type of target and a given radar system. By making the nonlinear resistor variable, adjustments can readily be made as a function of a force of the wind, which in turn determines the type of sea.

Figure 2:
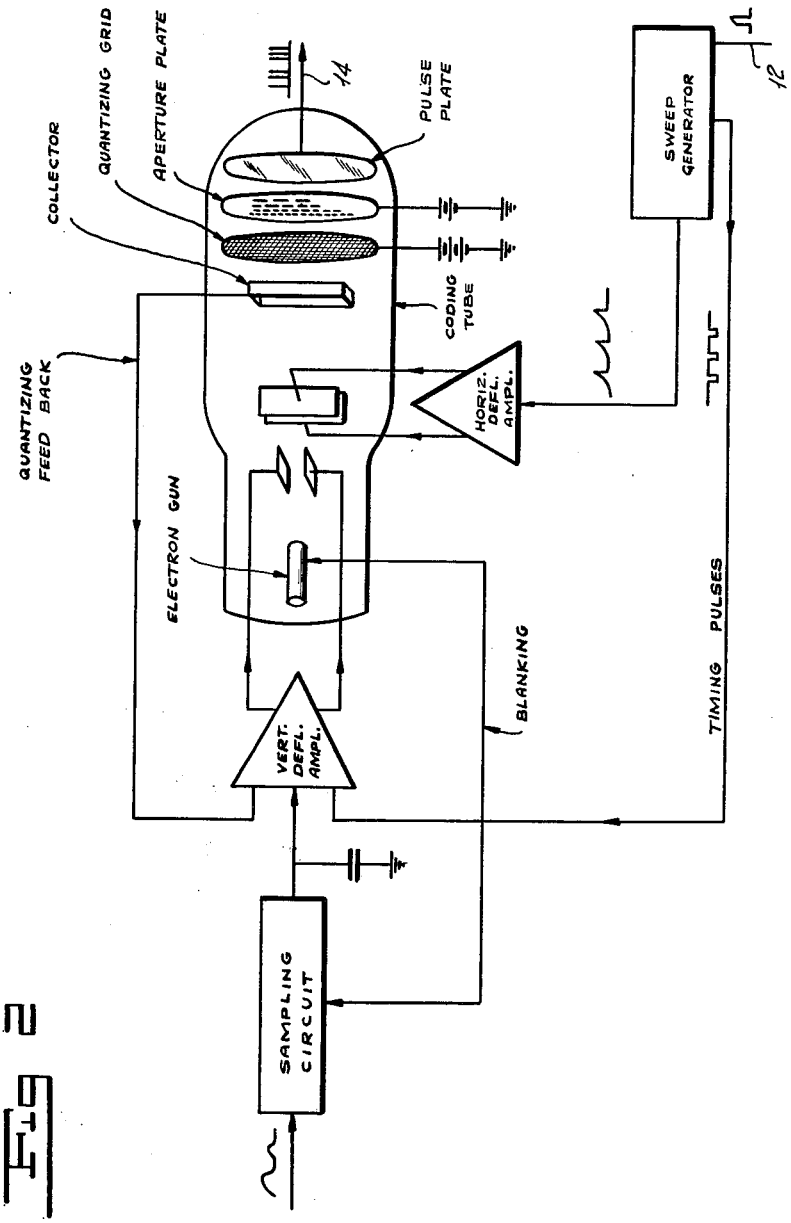
FIGURE 2 is a diagrammatic view of one form of translator adapted to be used in carrying out my invention.
Figure 3:
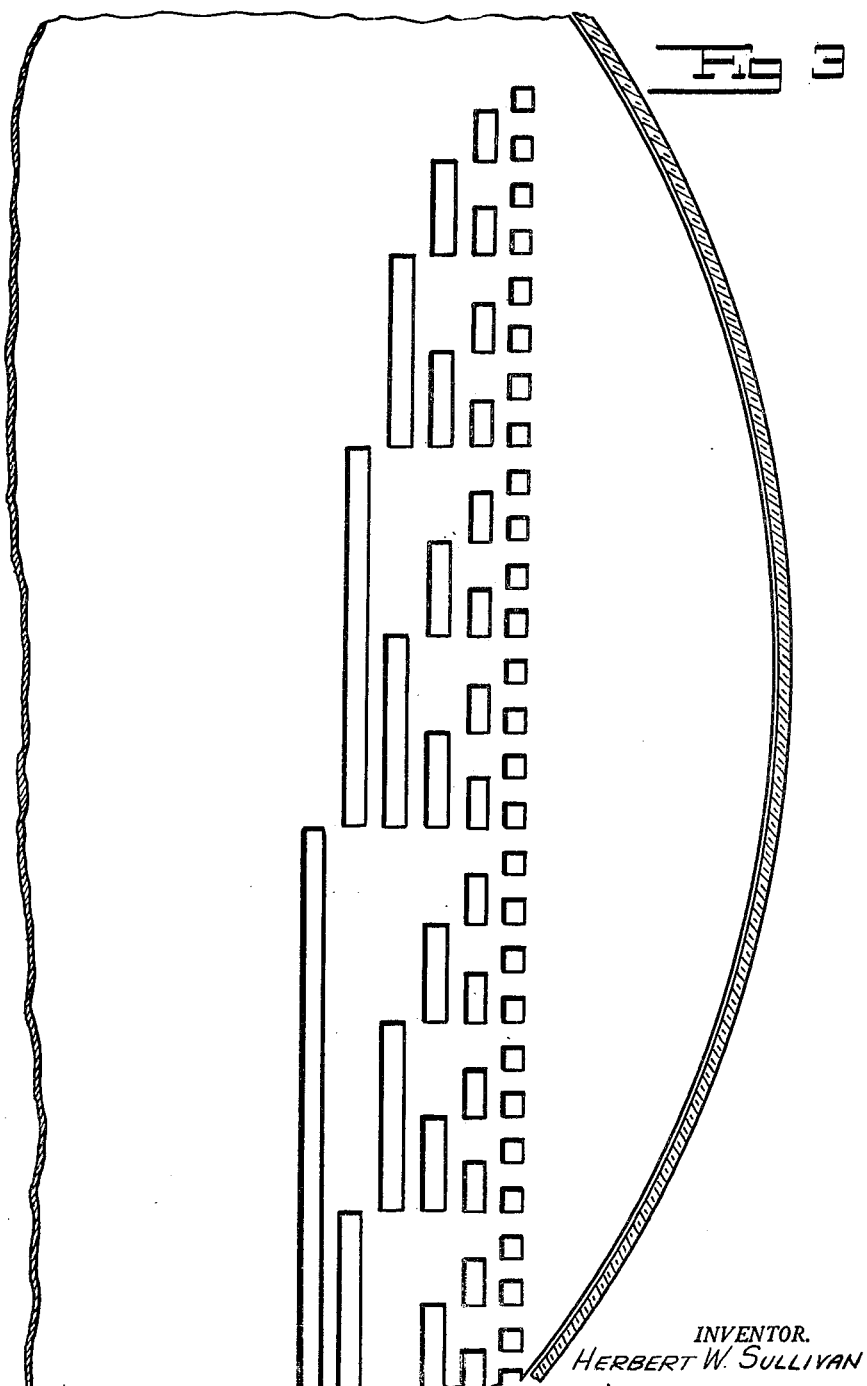
FIGURE 3 is a sectional view drawn on an enlarged scale of the aperture plate used in the translator of FIGURE 2.

Referring now to FIGURE 2, I have shown one type of a digital encoder. The encoder is described in detail in "The Bell System Technical Journal," vol. XXVII, No. 1, of January 1948, published by the American Telephone and Telegraph Company, at pages 1 to 57, inclusive. The principle comprises the quantizing or measuring of the signal amplitude to the nearest step in the discrete amplitude scale represented by the voltage on a vertical deflection plate. The amplitude of this signal is then translated into a group of on-and-off pulses identifying the step in the discrete amplitude scale. This is accomplished by sweeping the electron beam past an aperture plate provided with apertures in accordance with the digital system. A fragment of this aperture plate is shown in FIGURE 3. Let us assume that the beam sweeps from left to right and that no signal is produced by the beam upon the pulse plate unless the beam passes through an aperture in the aperture plate. If an accuracy of one part in 250,000 were required there would be eighteen vertical columns. An aperture in the first column indicates 1; an aperture in the second column indicates 2; an aperture in the third column indicates 4; an aperture in the fourth column indicates 8; in the fifth column 16; in the sixth column 32; in the seventh column 64; in the eighth column 128; in the ninth column 256; in the tenth column 512; in the eleventh column 1024; in the twelfth column 2048; in the thirteenth column 4096; in the fourteenth column 8192; in the fifteenth column 16,384; in the sixteenth column 32,768; in the seventeenth column 65,536 and in the eighteenth column 131,072.

Number 1 will be represented by 000000000000000001. Each zero indicates no signal and the 1 represents a pulse in the column. The number 128, for example, would appear as 000000000010000000. The number 17,000 would appear as 000100001001101000. The number 12,345 would appear as 000011000000111001.

While there are eighteen columns there would have to be 250,000 levels if numbers from 1 to 250,000 are to be represented. All these numbers, however, can be represented by the eighteen pulses, which are either on or off.

In actual practice, an accuracy as high as one in 250,000 would not be necessary and accuracies of one part in 32,000 could be achieved with fifteen columns and 32,000 levels. The apertures in the aperture plate, of course, are very small in order to prevent the tube for the pulse code modulation from becoming too cumbersome and unwieldy.

The coder, in addition to the tube itself, has a sampling and a holding circuit which sorts out the odd or even channels from the input multiplex system, push-pull amplifiers for vertical and horizontal deflections and arrangements for blanking, focusing and centering. In FIGURE 2 there is shown the conventional electron gun, the vertical and horizontal deflection plates, a rectangular collector for secondary electrons, a quantizing grid, the aperture plate which was discussed above and the pulse plate. The digit holes in the aperture plate are laid out in accordance with the binary code, as pointed out above. The quantizing grid contains horizontal wires uniformly spaced and accurately aligned so as to mask the upper and lower edges of every one of the apertures when viewed from the geometric point of origin of the beam. Stored samples from the sampling and holding circuit provide potential for the vertical deflection with zero at the upper portion of the aperture plate. The amplitude of deflection, of course, indicates the magnitude of the signal and it is this which is encoded. A saw-tooth sweep provides the horizontal deflection. The beam is blanked while deflection potentials are being charged to move it upward or downward from one sample amplitude to the next. When first restored, the beam strikes the left-hand unperforated region of the aperture plate and sweeps linearly across from left to right. Electrons which pass through the digit holes during the sweep are caught by the pulse plate forming the pulses which may be amplified and passed to the integrator. Retrace of the sweep occurs while the beam is blanked and is simultaneous with the application of the succeeding sample.

The wires of the quantizing grid are used to divide the beam so that it can illuminate only the particular row of apertures which correspond to the initial vertical deflection. But for this feature, erroneous codes would be produced if the beam straddled the edges of the apertures or crossed from one amplitude level to the other. The guiding action is obtained by means of a feedback from the quantizing grid to the vertical deflection amplifier. The feed-back signal is actually a current taken from the positively biased collector which draws to it secondary electrons from the grid wire. The portion of the beam current striking the grid varies as a cyclic function of the vertical deflection. The sweep generator is controlled by a timing pulse through conductor 12 and is adapted to sweep any desired number of times during each interval between timing pulses so that the radar signal is sampled at a large number of positions between successive main bangs, each position corresponding to a particular range.

The spot can come to rest vertically only within one of the stable regions. In order to locate it consistently near the center of such a region and thus gain equal margins against hopping upward or downwardly across the quantizing grid wires a quantizing bias is introduced into the vertical deflection amplifier along with the feedback and signal samples. This bias is a current of opposite polarity from the unidirectional feed-back current and of a magnitude equal to the average between the two values of feed-back current which exist when the beam falls first directly on the grid wire and second midway between two wires. We may consider this bias as pressing the beam upward against a wire resisted by downward pressure associated with the feed-back current which increases as the beam approaches the wire so that equilibrium is reached when the beam is about halfway between a grid wire and a position midway between the two wires. The feed-back current is actually intermittent, being turned on and off by the blanking pulse. It is necessary to make the bias intermittent as well with its wave fronts synchronous with those of the feed-back current. This is accomplished quite simply by deriving the bias from the blanking signal itself. With this arrangement the beam, when it is suddenly turned on, moves either upward or downward from its initial unquantized position to the nearest position of stable equilibrium. This is achieved substantially instantaneously. Thereafter as the beam is swept horizontally across the target area it remains pressed upwardly against the lower surface of its guiding wire. Quantization is thus maintained until the end of the sweep, when blanking occurs.

It will be seen that we have taken the analogue signal from the receiver and passed it through a nonlinear resistor to an encoder and have converted the signal from analogue to binary form so that it is now represented by a plurality of series of pulses each representing the amplitude of the signal at a point therealong. The signal now goes through channel 14 to the integrator, which is shown in FIGURE 4. It comprises an adder 16, shown in detail in FIGURE 5, and a memory 18, shown in detail in FIGURE 6. The signal entering through channel 14 may be termed the addend, the signal coming from the memory 18 through channel 20 may be termed the augend and the signal coming from the adder 16 to the memory through channel 22 may be termed the sum. The signal from the memory may also be fed through channel 24 to the decoder, as will be pointed out more fully hereinafter. The adder, shown in detail in FIGURE 5, is described at length in "High Speed Computing Devices," by the staff of Engineering Research Associates, Inc., published by McGraw-Hill Book Company, Inc. in 1950. The adder can be said to be a three-input binary adder, discussed on pages 276 et seq. of this work. If we let the letter C designate the carry and the letter C' designate the previous carry, the adder conforms to the following laws:

$$S=(A+B+C') \text{ or } [A \text{ or } B \text{ or } C' \text{ and not } \{(A+B) \text{ or } (A+C') \text{ or } (B+C')\}]$$

$$C=(A+B) \text{ or } (A+C') \text{ or } (B+C')$$

In FIGURE 5 the addend A enters through channel 14. Triple-control grid gate tubes are used. The augend B is impressed upon channel 20 and the carry C is impressed through channel 28 by means of a delay line indicated generally by the reference numeral 30. The delay line is made synchronous with the interpulse period so that the carry will be delayed one pulse time. A pulse received on A, B or C will gate a pulse out of tube 32 as a sum. Two pulses, however, will be detected by tubes 34, 36 or 38 and used to inhibit a sum pulse through tubes 40, 42 or 44 by holding their second grids negative. Two pulses will also place a carry pulse in the delay circuit. These pulses are detected by tube 46 which gates a sum pulse through the tube 32 despite the inhibiting action of tubes 34, 36 and 38 or tubes 40, 42 and 44. The control pulse is impressed upon a grid of tube 32 through channel 48. Sum pulses gated through tube 32 leave through channel 22 and pass to the memory assembly 18 as the input.

Figure 6:
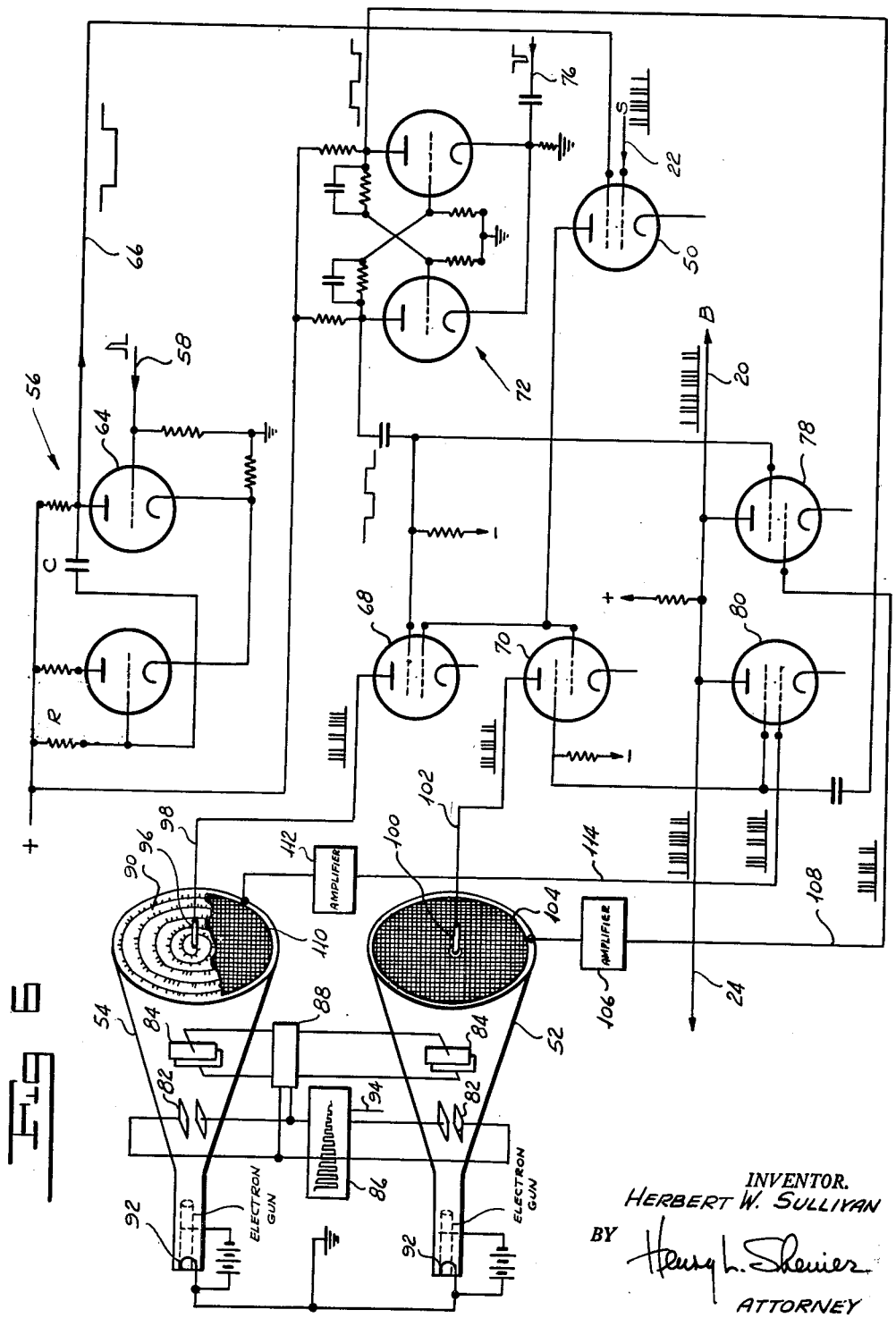
FIGURE 6 is a diagrammatic view of the memory subassembly of the integrator shown in FIGURE 4.

Referring now to FIGURE 6, the sum arrives upon a grid of tube 50. Tube 50 is normally active. The memory tubes 52 and 54 have limited storage capacity and must be cleared periodically. To permit this clearing I provide a monostable multivibrator indicated generally by the reference numeral 56, which is controlled through channel 58 by a control pulse obtained from a counter 60 shown diagrammatically in FIGURE 4. Each synchronizing pulse through channel 62 enters the counter 60 and after a predetermined number of synchronizing pulses have been counted by the counter 60 a control pulse is generated which is impressed through channel 58 upon the grid of tube 64 of the monostable multivibrator, the parameters of which are such that a negative blocking pulse of one sweep length in duration is impressed through channel 66 upon a control grid of tube 50, preventing the operation of the memory for a period of one sweep.

The output of tube 50 is impressed upon one or the other of the memory tubes 52 or 54 through a pair of gating tubes 68 and 70 controlled by a flip-flop assembly indicated generally by the reference numeral 72. The control pulse of the flip-flop assembly is derived from an inverter 74, shown in FIGURE 4, and impressed through channel 76 upon the flip-flop assembly 72. The arrangement is such that when the sum pulses are being stored in one memory tube 54 during a sweep the other memory tube 52 is being read and simultaneously erased to prepare it for receiving the next sum while the companion memory tube is being read and erased. For example, if writing gate 68 were conditioned to permit sum pulses to be stored in memory tube 54, reading gate tube 78 would be in condition to read the sum theretofore stored in memory tube 52. This sum is the augend and passes through channel 20 to the adder and simultaneously through channel 24 to the decoder, shown in FIGURE 1 and which will be described more fully hereinafter. Similarly, when writing gate 70 is operative the sum pulses will be written in memory tube 52 while writing gate 68 is rendered inoperative. At this time reading gate 80 will be operative to read the sum stored in memory tube 54 while reading gate 78 will be blocked.

Each memory tube comprises two sets of deflecting plates 82 and 84 disposed at right angles to each other. A damped sine-wave generator 86 impresses a signal comprising a sine wave continuously damped. This signal is impressed upon plates 82 of each memory tube. The signal passes to a 90° phase shifter 88 so a cosine corresponding to the sine produced by the sine generator 86 and similarly damped is impressed upon the deflecting plates 84. The face 90 of each memory tube is coated with a phosphor so that the stream of electrons originating at the cathode 92 of each tube will leave a path of charge in the phosphor. The deflecting plates 82 and 84 will cause the beam of electrons to describe a spiral starting from the outer periphery of the tube end and spiraling toward the center as the amplitude of the sine and cosine decreases. A control pulse for the damped sine-wave generator 86 is impressed through channel 94 so that a spiral will be described by the electron gun of each memory tube upon the end of the tube during each sweep. The sum pulses passing through writing gate 68 are impressed upon a centrally positioned electrode 96 of tube 54 through channel 98. Similarly, the sum pulses from writing gate 70 are impressed upon a central electrode 100 of tube 52 through channel 102. These pulses will deflect the electron beam in accordance with their magnitude so that what is written upon the memory tube is a spiral with a plurality of pulses of equal amplitude at various spacings in accordance with the digital code. During the reading, the electron beam traverses the same path and the potential of a pulse will be registered upon end screen 104. Whenever, a pulse appears, the increased potential will generate a signal in the end screen 104. This signal is amplified by the amplifier 106 in the case of tube 52 and passes through channel 108 to the reading gate 78. Similarly, pulses are read by end screen 110, amplified by amplifier 112 and passed through channel 114 to the reading gate 80 in the case of tube 54. The cumulation of a large number of pulses being continuously added and readded will eventually make the pulse values in memory tubes 52 and 54 too large for the capacity of the tubes. It is for this reason that periodically the tubes are cleared, as described above.

Due to the secondary emission effect of an electron beam over the phosphor, the trace left by the last writing will be erased simultaneously with the reading so that the memory tube just read is ready to receive the next series of sum pulses when gated to write.

It will be seen that during each sweep the sweep is cut into a plurality of discrete points by the sweep generator of the translator shown in FIGURE 2. At each of these points the sweep signal is transferred from analogue form and the return at any one point is added to the return at this same point in the succeeding sweep. The sum of the two is added to a third return and this process continues until noise and ground clutter are integrated out or minimized and a target return cumulated or emphasized. The digital signal now is capable of ready reading to distinguish a target. It must, however, be reconverted into analogue form so that it may be presented on the radar indicator. The signal, which now is in the form of a series of digital pulses, must be decoded or reconverted into analogue form. This can be done in any suitable manner. I prefer to use a simple arrangement proposed by C. E. Shannon and known as the "Shannon-Rack Decoding System." This is described in an article entitled "An Experimental Multichannel Pulse Code Modulation System of Toll Quality," by L. A. Meacham and E. Peterson in "The Bell System Technical Journal" of January 1948. A typical circuit for the decoder is shown in FIGURE 8. The input is switched into two chanels X and Y by a gating wave form generated in a flip-flop assembly 150 controlled by a synchronizing pulses through channel 152 which in turn controls a gating assembly indicated generally by the reference numeral 154. The duplicate channels are required in order to allow a recovery period for the voltage at the sampler input to return to its steady state value. In its basic form the decoder employs a pulsed resistance-capacitor circuit, as can be seen by reference to FIGURE 8. Upon the arrival of each pulse of the code an identical increment of the charge is placed upon the capacitor of the decoder. The time constant ($t=RC$) is such that during any single pulse interval, whatever charge is on the capacitor decays precisely fifty percent in amplitude. Thus the last charge remaining on the capacitor one pulse period after the arrival of the last pulse of a coded group is weighted in a binary manner. By sampling and storing this weighted voltage, the analogue information is obtained. To make the system less critical, a damped oscillatory circuit is added in series with the resistance and capacitance. When the natural frequency of $L_1R_1C_1$ is equal to the pulse repetition rate and the time constant of the damped oscillation is made equal to twice $R_1C_1$ the decaying wave form shown in FIGURE 7 is obtained. By the proper choice of C and $C_1$ the amplitudes of the damped sine wave and the exponential may be proportional so that the rate of change and their combined potential becomes zero at successive points one pulse period apart. The pulse standardizer is a typical squaring and clipping circuit and is used to insure that RC is charged by successively equal amounts. The switch-charging source is a gated beam power pentode. The operation of the decoder will be clear by a reference to FIGURE 7, which shows the wave forms in the decoder. The final analogue output leaves the decoder through channel 156 and passes to the indiactor in analogue form so that it may be presented by a conventional indicator in the customary manner.

It will be seen that what I have done in essence is to take the analogue signal from a conventional radar receiver, modify it as a nonlinear function, translate it into a binary coded signal, continuously integrate successive coded signals, continuously decode the integrated signals to convert them into analogue form and then impress the converted analogue signal upon a conventional radar indicator of any appropriate type.

It is pointed out above that the nonlinear impedance 10 introduced a nonlinear function into the signal leaving the receiver. This enables me to vary the weight of the returns with respect to their amplitude so that all returns, for example, above a certain amplitude may all be reduced in weight, thus emphasizing or giving additional weight in a nonlinear manner to returns below a predetermined amplitude. In this manner ground and sea clutter can be the more readily integrated out while target returns will be permitted to cumulate since they will always appear at the same position as the target occupying a given range.

In operation, the switch 11 is normally set to connect the output of the nonlinear impedance 10 with the channel 13 leading directly to the indicator, which may have any suitable presentation known to the art, for example, type A, type H, type K, type M or type P (PPI). These presentations are all described in detail in M.I.T. Radiation Laboratories Series, volume 22, and in "Cathode-Ray Tube Displays" published by McGraw-Hill Book Company, New York, 1947. In this case the analogue signal from the receiver goes directly to the indicator through the nonlinear impedance. The radar, which may have any desired carrier frequency, transmitter pulse width, pulse repetition rate and duty cycle, is then set into operation. Repeated powerful bursts of ultrahigh-frequency radio waves are generated by the transmitter at times determined by the synchronizer. The pulse repetition rate must be slow enough to allow time for the maximum range echos or reflections from objects in the path of the waves, beamed by the antenna in a given direction, to return to the antenna before another pulse is transmitted and it must be sufficiently rapid to provide enough traces while the antenna is moving to produce a lasting indication on the indicator which is usually an oscilloscope screen. The maximum range, therefore, determines the highest pulse rate and the rotational speed of the antenna determines the lowest pulse rate which can be used. In practice, these rates vary widely, as is well known to the art.

The antenna beams and radiates the energy into space and picks up the returning echo for passage to the receiver. There is a transmit-receive switch automatically operated to prevent the transmitter energy from harming the receiver. This is known to the art and is therefore not shown or described in detail.

Where there are large targets or the range is not great the targets can usually be distinguished readily. The nonlinear impedance is varied at this point to produce the sharpest target return. If no targets are visible or if a doubtful return is desired to be investigated, switch 11 is operated to disconnect the receiver from channel 13 and place the output of the nonlinear impedance upon the channel comprising the translator, the integrator and the decoder. It may be found at this time that it will be necessary to make an adjustment in the nonlinear impedance, depending upon the particular ground and sea clutter. Owing to my system, false returns which will occur fortuitously and accidentally will be reduced by integration in the signal going to the decoder and concomitantly target returns will be emphasized so that the analogue signal passing to the indicator through channel 156 will enable an operator to distinguish a target at much longer ranges than otherwise would be possible and of much smaller dimensions than could be achieved and under more adverse conditions than would be possible but for my invention.

It will be seen that I have accomplished the objects of my invention. I have provided a radar system with increased range for a given power output and a predetermined antenna system. I have provided a radar system having increased resolution and accuracy and one which enables me to pick up difficult targets at long range in difficult terrain. I have provided a radar system in which the parameter of the system can be readily changed to accommodate for various types of ground and sea clutter and one in which an operator is readily able to discriminate between target return and noise under marginal conditions for a given conventional radar assembly.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A radar system including in combination a transmitter for generating short, powerful bursts of ultrahigh-frequency radio waves at a predetermined repetition rate, an antenna for beaming the radio waves in a given direction and for receiving reflections of the waves from objects in their path, a receiver for converting the reflected waves into an analogue signal means for varying a characteristic of said analog signal in a non-linear manner, a translator for converting the non-liner analogue signal into a digital signal, a channel for coupling the non-linear analogue signal to the translator, an integrator including a memory device for serially adding successive digital signals, a channel for passing the digital signals from the translator to the integrator, a decoder for converting digital signals into analogue signals, a channel for passing the serially added signals from the integrator to the decoder, an indicator for displaying analogue signals to present an indication of the ranges of the reflected objects from the antenna and a channel for passing the decoded analogue signals from the decoder to the indicator.

2. A radar system including in combination a transmitter for generating short, powerful bursts of ultrahigh-frequency radio waves at a predetermined repetition rate, an antenna for beaming the radio waves in a given direction and for receiving reflections of the waves from objects in their path, a receiver for converting the reflected waves into an analogue signal, a translator for converting the analogue signal into a digital signal, a channel for passing the analogue signal to the translator, a nonlinear impedance in said channel through which the analogue signal must pass, an integrator for serially adding successive digital signals, a channel for passing the digital signals from the translator to the integrator, a decoder for converting digital signals into analogue signals, a channel for passing the serially added signals from the integrator to the decoder, an indicator for displaying analogue signals to present an indication of the ranges of the reflected objects from the antenna and a channel for passing the decoded analogue signals from the decoder to the indicator.

3. A radar system including in combination a transmitter for generating short, powerful bursts of ultra-high frequency radio waves at a predetermined repetition rate, an antenna for beaming the radio waves in a given direction and for receiving reflections of the waves from objects in their path, a receiver for converting the reflected waves into an analogue signal, a translator comprising means for converting the analogue signal into a digital signal of binary form, a channel for passing the analogue signal to the translator, an integrator for serially adding successive digital signals, a channel for passing the digital signal from the translator to the integrator, a decoder for converting digital signals into analogue signals, a channel for passing serially added signals from the integrator to the decoder, an indicator for displaying the analogue signal to present an indication of the ranges of the reflected objects from the antenna, and a channel for passing the decoded analogue signals from the decoder to the indicator.

4. A radar system including in combination a transmitter for generating short powerful bursts of ultra-high frequency radio waves at a predetermined repetition rate, an antenna for beaming the radio waves in a given direction and for receiving reflections of the waves from the objects in their path, a receiver for converting the reflected waves into an analogue signal, a translator for converting the analogue signal into a digital signal, a channel for passing the analogue signl to the translator, an integrator for serially adding successive digital signals, said integrator comprising an adder assembly, a memory assembly, the digital signal being continuously passed to the adder assembly through the channel from the translator, a channel for passing the output of the adder assembly to the memory assembly, and a channel for recycling the output of the memory assembly to the adder assembly, the channel for passing the output of the integrator to the decoder being connected to the memory assembly; a channel for passing the digital signals from the translator to the integrator, a decoder for converting digital signals into analogue signals, a channel for passing the serially added signals from the integrator to the decoder, an indicator for displaying analogue signals to present an indication of the ranges of the reflected objects from the antenna and a channel for passing the decoded analogue signals from the decoder to the indicator.

5. A radar system including in combination a transmitter for generating short powerful bursts of ultra-high frequency radio waves at a predetermined repetition rate, an antenna for beaming the radio waves in a given direction and for receiving reflections of the waves from the objects in their path, a receiver for converting the reflected waves into an analogue signal, a translator for converting the analogue signal into a digital signal, a channel for passing the analogue signal to the translator, an integrator for serially adding successive digital signals said integrator comprising an adder assembly, a memory assembly, the digital signal being continuously passed to the adder assembly through the channel from the translator, a channel for passing the output of the adder assembly to the memory assembly, a channel for recycling the output of the memory assembly to the adder assembly, the channel for passing the output of the integrator to the decoder being connected to the memory assembly, and means for clearing a memory assembly at predetermined periodic intervals; and a channel for passing the digital signals from the translator to the integrator, a decoder for converting digital signals into analogue signals, a channel for passing the serially added signals from the integrator to the decoder, an indicator for displaying analogue signals to present an indication of the ranges of the reflected objects from the antenna, a channel for passing the decoded analogue signals from the decoder to the indicator.

6. A radar system including in combination a transmitter for generating short, powerful bursts of ultra-high frequency radio waves at a predetermined repetition rate, an antenna for beaming the radio waves in a given direction and for receiving reflections of the waves from objects in their path, a receiver for converting the reflected waves into an analogue signal, a translator comprising a cathode ray tube provided with an aperture plate having apertures formed therein and disposed in accordance with a binary code for converting the analogue signal into a digital signal, a channel for passing the analogue signal to the translator, an integrator for serially adding successive digital signals, a channel for passing the digital signals from the translator to the integrator, a decoder for converting digital signals into analogue signals, a channel for passing the serially added signals from the integrator to the decoder, an indicator for displaying analogue signals to present an indication of the ranges of the reflected objects from the antenna and a channel for passing the decoded analouge signals from the decoder to the indicator.

7. A radar system including in combination a transmitter for generating short, powerful bursts of ultra-high frequency radio waves at a predetermined repetition rate, an antenna for beaming the radio waves in a given direction and for receiving reflections of the waves from the objects in their path, a receiver for converting the reflected waves into an analogue signal, a translator for converting the analogue signal into a digital signal, a channel for passing the analogue signal to the translator, an integrator for serially adding successive digital signals, a channel for passing the digital signals from the transaltor to the integrator, a decoder including a pulsed resistance-capacitor circuit and gating means for controlling the application of the input to the resistance-capacitor circuit for converting digital signals into analogue signals, a channel for passing the serially added signals from the integrator to the decoder, an indicator for displaying analogue signals to present an indication of the ranges of the reflected objects from the antenna and a channel for passing the decoded analogue signals from the decoder to the indicator.

8. A radar system comprising a transmitter for generating short pulses of ultra high frequency radio waves at a predetermined rate, an antenna operatively connected to said transmitter for beaming said radio waves in given directions and for receiving reflections of said radio waves from objects in their path, means connected to said antenna and including portions thereof for receiving and converting said reflected radio waves into digital signals of binary form, an integrator device connected to said means for serially adding successive ones of said digital signals, and means operatively connected to said integrator to provide a representation of said added digital signals.

References Cited in the file of this patent

UNITED STATES PATENTS

| | | |
|---|---|---|
| 2,400,796 | Watts | May 21, 1946 |
| 2,430,038 | Wertz | Nov. 4, 1947 |
| 2,446,244 | Richmond | Aug. 3, 1948 |
| 2,487,995 | Tucker | Nov. 15, 1949 |
| 2,521,016 | Miller | Sept. 5, 1950 |
| 2,524,837 | Russell et al. | Oct. 10, 1950 |
| 2,530,538 | Rack | Nov. 21, 1950 |
| 2,595,691 | Morton | May 6, 1952 |
| 2,663,015 | Sunstein | Dec. 15, 1953 |

OTHER REFERENCES

"Electron Beam Deflection Tube for Pulse Code Modulation" by R. W. Sears, published in vol. 27, #1, Bell System Technical Journal, January 1948, pp. 44–57.